(12) United States Patent
Huang et al.

(10) Patent No.: US 8,153,308 B2
(45) Date of Patent: Apr. 10, 2012

(54) HYDROGEN STORAGE ELECTRODE

(75) Inventors: Qunjian Huang, Shanghai (CN); Chang Wei, Niskayuna, NY (US); Tao Wang, Erie, PA (US); Hai Yang, Shanghai (CN)

(73) Assignee: General Electric Company, Niskayuna, NY (US)

( * ) Notice: Subject to any disclaimer, the term of this patent is extended or adjusted under 35 U.S.C. 154(b) by 1231 days.

(21) Appl. No.: 11/861,789

(22) Filed: Sep. 26, 2007

(65) Prior Publication Data

US 2008/0299444 A1    Dec. 4, 2008

Related U.S. Application Data

(63) Continuation-in-part of application No. 11/172,249, filed on Jun. 30, 2005, now Pat. No. 7,311,991.

(51) Int. Cl.
*H01M 4/36* (2006.01)
*H01M 4/13* (2006.01)

(52) U.S. Cl. ..................... 429/405; 429/218.2

(58) Field of Classification Search .................. 429/405, 429/218.2
See application file for complete search history.

(56) References Cited

U.S. PATENT DOCUMENTS

| | | | |
|---|---|---|---|
| 5,354,573 A * | 10/1994 | Gross et al. .................. 426/603 |
| 5,529,857 A * | 6/1996 | Nogami et al. ................ 429/59 |
| 5,725,042 A * | 3/1998 | Hirose et al. ................ 164/114 |
| 5,843,372 A * | 12/1998 | Hasebe et al. ............... 148/538 |
| 6,174,345 B1 * | 1/2001 | Chen et al. ...................... 75/351 |
| 6,478,844 B1 * | 11/2002 | Ovshinsky ...................... 75/352 |
| 6,569,567 B1 * | 5/2003 | Reichman et al. ......... 429/218.2 |
| 6,613,471 B2 | 9/2003 | Ovshinsky et al. |
| 6,790,558 B2 * | 9/2004 | Okada et al. ............... 429/218.2 |
| 2002/0064709 A1 * | 5/2002 | Ovshinsky et al. ........ 429/218.2 |
| 2004/0121228 A1 * | 6/2004 | Ovshinsky et al. ........... 429/131 |

OTHER PUBLICATIONS

Wu et al., "Electrochemical Investigation of Hydrogen-Storage Alloy Electrode With Duplex Surface Modification", International Journal of Hydrogen Energy, vol. 29, pp. 1263-1269, 2004.
Liu et al., "The Electrochemical Activation and Surface Properties of Zr-based AB2 Metal Hydride Electrodes", Journal of Alloys and Compounds, vol. 255, pp. 43-49, 1997.
Liu et al., "Improved Electrochemical Performance of AB2-type Metal Hydride Electrodes Activated by the Hot-charging Process", Journal of Alloys and Compounds, vol. 245, pp. 132-141, 1996.

* cited by examiner

*Primary Examiner* — Lore Jarrett
(74) *Attorney, Agent, or Firm* — Joseph J. Christian (57) ABSTRACT

An electrode includes a hydrogen storage material wherein the electrode has a discharge capacity of greater than about 200 mHh/g. The electrode may include an electrically conductive substrate; and a material capable of storing hydrogen on a surface thereof supported by the substrate. The hydrogen storage material is formed by contacting a powder composition with a first solution prior to electrode fabrication and by contacting the hydrogen storage material to a second solution subsequent to electrode fabrication; and the first solution comprises a first reducing agent and a first alkaline base, and the second solution comprises a second reducing agent and a second alkaline base.

19 Claims, 3 Drawing Sheets

HYDROGEN STORAGE ELECTRODE

CROSS REFERENCE TO RELATED APPLICATION

This application is a Continuation-In-Part of U.S. patent application Ser. No. 11/172,249, filed on 30 Jun. 2005, which is incorporated by reference herein.

BACKGROUND

1. Technical Field

The invention includes embodiments that relate to an article for storing hydrogen. The article may be an electrode that can store hydrogen.

2. Discussion of Art

An electrochemical system, such as a fuel cell or a battery, is capable of efficient energy conversion and can be used in a variety of applications. These applications may include transportation applications, portable power sources, home power generation, and large-scale power generation. A fuel cell can generate energy as long as fuel is supplied. A battery, by contrast, is limited to the amount of stored energy it can hold—and some can be recharged thereafter. Fuel cell systems may consume oxygen and hydrogen to emit water and energy. The energy may be in the form of electric power and heat.

In a fuel cell device, hydrogen is supplied to the anode, or can be stored within the anode, while an oxidant is supplied to the cathode. Hydrogen can also be stored at the negative electrode of a battery. For example, metal hydrides may be used as a material for the negative electrode of a battery. Such batteries may include air-metal hydride batteries and Ni-metal hydride batteries. Metal hydride materials may be activated before being integrated into electrodes. Untreated metal hydrides may form an oxide layer on the surface of the metal hydride. The oxide layer may lead to poor charging efficiency and low discharge capacity of the electrode. An activation process removes the oxide layer from the surface of the metal hydride. Untreated metal hydrides may sometimes need additional electrochemical charge-discharge cycles to reach the maximum storage capacity of the metal hydride material and the initial discharge capacity may be too low to run the electrochemical system as efficiently as desired.

Oxide formation on the surface of the metal hydride may be reduced or prevented by hot alkali treatment, acid treatment, and chemical reduction method using reductants in alkali solution. These methods may treat the metal hydride powder. Further activation of the metal hydride electrode may not be done if the powder itself was activated prior to the electrode fabrication. Similarly when the fabricated metal hydride electrode is activated, the metal hydride powder itself may not be activated.

It may be desirable to have an apparatus or system with properties and characteristics that differ from those properties of currently available apparatus or system. It may be desirable to have a method that differs from those methods currently available.

BRIEF DESCRIPTION

In one embodiment, an electrode includes a hydrogen storage material wherein the electrode has a discharge capacity of greater than about 200 mAh/g.

In one embodiment, an electrode includes an electrically conductive substrate; and a material capable of storing hydrogen on a surface thereof supported by the substrate. The hydrogen storage material is formed by contacting a powder composition with a first solution prior to electrode fabrication and by contacting the hydrogen storage material to a second solution subsequent to electrode fabrication; and the first solution comprises a first reducing agent and a first alkaline base, and the second solution comprises a second reducing agent and a second alkaline base.

In one embodiment, an electrode includes a hydrogen storage material. And, the electrode, at a potential of less than about −0.09 volts, during discharge evolves hydrogen in an amount of time relative to the application of the voltage that is less than about $1.4 \times 10^4$ seconds.

BRIEF DESCRIPTION OF DRAWINGS

Like characters represent like parts throughout the drawings, wherein.

DETAILED DESCRIPTION

The invention includes embodiments that relate to an article for storing a fluid. The article may be an electrode that can store hydrogen.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable.

Powder is defined as a dry, bulk solid composed of a large number of very fine particles that may flow freely when shaken or tilted. As used herein, powder is inclusive of granulals of all morphologies unless specified otherwise. An electrode is an electrical conductor used to make contact with another part of a circuit. An anode is the electrode at which electrons leave the cell and oxidation occurs, and a cathode is the electrode at which electrons enter the cell and reduction occurs. Each electrode may become either the anode or the cathode depending on the voltage applied to the cell. A bipolar electrode is an electrode that functions as the anode of one cell and the cathode of another cell.

In one embodiment, a hydrogen-storage based electrode for use in an electrochemical device is provided. A powder composition may be treated. The powder composition includes a metal hydride. The powder composition sequentially is contacted with first and second solutions. The first solution includes a first alkaline base and a first reducing agent. An electrode is fabricated from the powder composition. The electrode is contacted with a second solution. The second solution includes a second alkaline base and a second reducing agent.

In one embodiment, an electrode includes a hydrogen storage material wherein the electrode has a discharge capacity of greater than about 200 mAh/g. In one embodiment, an electrode includes a hydrogen storage material. And, the electrode, at a potential of less than about −0.09 volts, during discharge evolves hydrogen in an amount of time relative to the application of the voltage that is less than about $1.4 \times 10^4$ seconds.

The electrochemical performance of the electrode improves when processed and fabricated as disclosed herein. The disclosed method includes activating the powder composition, forming the electrode, and activating the electrode. The powder composition is an active part of a hydrogen fluid, storage electrode.

Suitable powder compositions may include a metal hydride. Suitable metal hydrides may include one or more alkali metal borohydrides, alkaline earth borohydrides, alkaline earth alanates, or catalyzed complex hydride. In one embodiment, the metal hydride is an $AB_5$ alloy, $AB_2$ alloy, AB alloy, $A_2B$ alloy, $A_2B_{17}$ alloy, or $AB_3$ alloy.

A suitable $AB_5$ alloy may include one or more of $LaNi_5$ or $CaNi_5$. Another suitable $AB_5$ alloy may include $MA_xB_yC_z$, wherein M is a rare earth element component, A is one of the elements Ni or Co, B is one of the elements Cu, Fe or Mn, C as one of the elements Al, Cr, Si, Ti, V and Sn, and x, y and z satisfy the following relations, wherein 2.2 is less than or equal to x is less than or equal to 4.8; 0.01 is less than or equal to y is less than or equal to 2.0; and 0.01 is less than or equal to z is less than or equal to 0.6; and 4.8 is less than or equal to x+y+z is less than or equal to 5.4.

A suitable $AB_2$ may include Zr—V—Ni, Zr—Mn—Ni, Zr—Cr—Ni, TiMn, or TiCr. A suitable AB alloy may include TiFe and TiNi. A suitable $A_2B$ type alloy may include $Mg_2Ni$. A suitable $A_2B_{17}$ alloy may include $La_2Mg_{17}$. A suitable $AB_3$ type alloy may include $LaNi_3$, $CaNi_3$, or $LaMg_2Ni_9$.

In one embodiment, the anode material includes one or more catalyzed complex hydrides. The catalyzed complex hydrides may include one or more borides, carbides, nitrides, aluminides, titanates, or silicides. A suitable complex catalyzed alanate hydride may include $NaAlH_4$, $Zn(AlH_4)_2$, $LiAlH_4$, or $Ga(AlH_4)_3$. A suitable complex catalyzed borohydride may include $Mg(BH_4)_2$, $Mn(BH_4)_2$, $Zn(BH_4)_2$. Other suitable catalyzed complex hydrides are disclosed in the Example section.

In one embodiment, the electrode may include an organic material. Suitable organic materials may include carbon nanotubes or other electrically conducting polymers. Suitable electrically conducting polymers may include polypyrrole, polyacetylene, or polyaniline. Other suitable electrically conducting polymers may include one or more polythiophenes, polyfluorenes, poly-3-alkylthiophenes, polytetrathiafulvalenes, polynaphthalenes, poly-p-phenylene sulfides, or poly para-phenylene vinylenes.

In one embodiment, the electrode may include an inorganic material, such as boron nitride. The boron nitride may be in discrete granules or as BN nanotubes.

In one method, the metal hydride powder composition is treated or contacted to a first solution. The first solution includes a first reducing agent and a first alkaline base. The first reducing agent may include one or more of sodium borohydride, potassium borohydride, hydrazine, or citrate salt. The concentration of the first reducing agent in the first solution may be greater than about 0.01 molar. In one embodiment, the reducing agent concentration may be in a range of from about 0.01 molar to about 0.02 molar, from about 0.02 molar to about 0.03 molar, from about 0.03 molar to about 0.04 molar, from about 0.04 molar to about 0.05 molar, or greater than about 0.05 molar.

A suitable first alkaline base may be a hydroxide. The first alkaline base in the first solution may include one or more of potassium hydroxide, sodium hydroxide, lithium hydroxide, calcium hydroxide, or ammonium hydroxide. The concentration of the first alkaline base in the first solution may be greater than about 1 molar. In one embodiment, the alkaline base concentration may be in a range of from about 1 molar to about 2 molar, from about 2 molar to about 3 molar, from about 3 molar to about 4 molar, from about 4 molar to about 5 molar, from about 5 molar to about 6 molar, or greater than about 6 molar.

The activation process temperature may be greater than about 30 degrees Celsius. In one embodiment, the activation process temperature may be in a range of from about 30 degrees Celsius to about 40 degrees Celsius, from about 40 degrees Celsius to about 50 degrees Celsius, from about 50 degrees Celsius to about 60 degrees Celsius, from about 60 degrees Celsius to about 70 degrees Celsius, from about 70 degrees Celsius to about 80 degrees Celsius, from about 80 degrees Celsius to about 90 degrees Celsius, or greater than about 90 degrees Celsius. During contacting of the powder composition with the first solution, the contact process may require a contact time greater than about an hour. In one embodiment, the contact time may be in a range of from about 1 hour to about 5 hours. Contact time and process temperature may be determined with reference to each other.

During the process, the first alkaline base may remove metal oxide formed on the surface of the powder composition; and, the first reducing agent may form hydrogen on the surface of the powder composition. The hydrogen, so formed, may bond with, and protect, the surface from re-oxidation. As an illustrative example of one embodiment, the first solution includes sodium borohydride ($NaBH_4$) and potassium hydroxide (KOH). Sodium borohydride is a water reactive hydride and reacts with water to form atomic hydrogen as given in Reaction (1) below.

$$NaBH_4 + 2H_2O = NaBO_2 + 4H_2 \qquad (1)$$

Once the metal hydride powder composition is treated with the first solution, an alloy slurry of the powder composition is prepared. The treated metal hydride powder composition may be mixed with other conductive additives. Suitable conductive additives may include a nickel powder composition, cobalt powder composition, or activated carbon. Binders or binder precursors may be added to the slurry. Suitable binder additives may include polytetrafluoroethylene (PTFE), polyvinyl alcohol (PVA), and carboxymethyl cellulose (CMC).

In subsequent steps, the electrode is prepared. Pressing the slurry onto a shaped metal substrate may form a suitable electrode. In one embodiment, the electrode is prepared by pasting the alloy slurry onto both sides of a metal substrate. Suitable metal substrates may include nickel or stainless steel. The substrate may be a mesh, weave, mat, or foam. Other suitable electrode substrates may include a grid, matte, foil, plate and expanded metal. Alkaline solution compatible materials may be used. The conductivity of the electrode may increase by increasing the conductivity of the electrode substrate.

The electrode, as prepared above, is treated in subsequent steps with the second solution comprising the second base and the second reducing agent. The second solution includes a second reducing agent and a second alkaline base. The second reducing agent may include one or more of sodium borohydride, potassium borohydride, hydrazine, or citrate salt. The concentration of the second reducing agent in the second solution may be greater than about 0.01 molar. In one embodiment, the reducing agent concentration may be in a range of from about 0.01 molar to about 0.02 molar, from about 0.02 molar to about 0.03 molar, from about 0.03 molar to about 0.04 molar, from about 0.04 molar to about 0.05 molar, or greater than about 0.05 molar.

A suitable second alkaline base may be a hydroxide. The second alkaline base in the second solution may include one or more of potassium hydroxide, sodium hydroxide, lithium hydroxide, calcium hydroxide, or ammonium hydroxide. The concentration of the second alkaline base in the second solution may be greater than about 1 molar. In one embodiment, the alkaline base concentration may be in a range of from about 1 molar to about 2 molar, from about 2 molar to about 3 molar, from about 3 molar to about 4 molar, from about 4 molar to about 5 molar, from about 5 molar to about 6 molar, or greater than about 6 molar.

In the subsequent step when the electrode is treated with the second solution, the activation process temperature may be greater than about 30 degrees Celsius. In one embodiment, the activation process temperature may be in a range of from about 30 degrees Celsius to about 40 degrees Celsius, from about 40 degrees Celsius to about 50 degrees Celsius, from about 50 degrees Celsius to about 60 degrees Celsius, from about 60 degrees Celsius to about 70 degrees Celsius, from about 70 degrees Celsius to about 80 degrees Celsius, from about 80 degrees Celsius to about 90 degrees Celsius, or greater than about 90 degrees Celsius. During contacting of the electrode with the second solution, the contact process may require a contact time greater than about an hour. In one embodiment, the contact time may be in a range of from about 1 hour to about 5 hours. Contact time and process temperature may be determined with reference to each other.

In one embodiment, the electrode is an anode (negative electrode) in an electrochemical system. Suitable systems may include an air metal hydride battery, Ni-metal hydride batteries, fuel cells and regenerative fuel cells.

Figure 1:
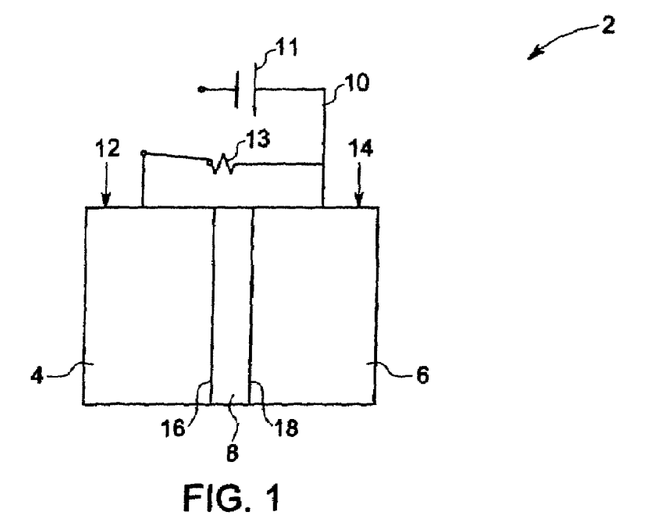
FIG. 1 illustrates a schematic diagram of an exemplary dual mode electrochemical system comprising a hydrogen storage electrode according to an embodiment of the invention.

FIG. 1 illustrates an exemplary dual mode electrochemical system 2. The system includes a first electrode 4 capable of storing hydrogen, and a second electrode 6. The first electrode is activated using the method described in the preceding sections. An electrically insulating and ionically conducting membrane 8 is disposed between the first electrode 4 and the second electrode 6. The electrochemical system 2 further includes an electrolyte (no reference number provided).

In dual mode operation, the electrochemical system 2 operates in a first mode and a second mode. During the first mode operation, water 12 and electricity are added to the electrochemical system. An external circuit 10 supplies the electricity. The external circuit includes a charging circuit 11 and a load 13. The dual electrochemical system electrolyzes water 18 in the presence of the electrolyte and produces hydrogen and oxygen across the membrane 8. The electrolysis-produced hydrogen is stored in the first electrode 4. The first mode of the dual electrochemical system is the charging mode. In the charging mode hydrogen is produced and stored in the first electrode 4. In the first mode or the charging mode the dual mode electrochemical system works in principle like an electrolyzer, wherein water is split into hydrogen and oxygen by applying electricity in the presence of an electrolyte.

In the second mode of operation, the dual mode electrochemical system operates as a fuel cell, wherein upon introduction of an oxidant 14, the stored hydrogen chemically reacts with the oxidant 14 across the membrane 8 to produce water and electricity. In the second mode or the discharge mode, the dual mode electrochemical system works as a fuel cell, wherein hydrogen and oxygen react to form water and electricity.

Figure 2:
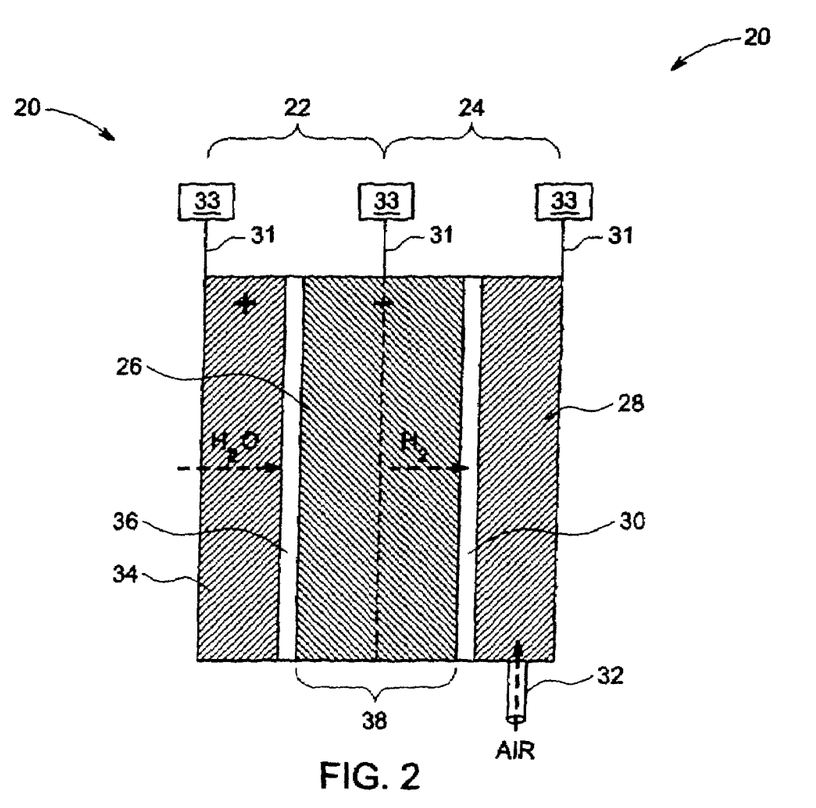
FIG. 2 is a schematic diagram of an electrochemical system for converting electrical energy into chemical energy and chemical energy into electrical energy comprising a hydrogen storage electrode.

FIG. 2 illustrates an exemplary electrochemical system 20. The system includes a hydrogen generator component 22 and a fuel cell component 24. The components are structurally and operationally connected via a common electrode 26. The fuel cell component 24 includes an anode, which is the negative electrode 26, and a fuel cell cathode 28, which is the, positive electrode. The anode and cathode may be separated from one another by a fuel cell membrane 30. A suitable fuel cell membrane may include a proton exchange membrane (PEM). Although the fuel cell structure and materials may vary, the fuel cell component 24 is a galvanic energy conversion device that chemically combines hydrogen and an oxidant within catalytic confines to produce a DC electrical output.

In one form of the fuel cell, the fuel cell cathode 28 and materials define passageways for the oxidant, and the common electrode 26 and materials define the passageways for the fuel. The hydrogen-generating component 22 of the hybrid system provides energy storage capacity and shares the negative electrode 26 of the fuel cell component 24. The hydrogen-generating component 22 further includes another electrode 34 and a separator 36. The structure of the hydrogen-generating component 22 may include one or more identical cells, with each cell comprising another electrode 34, the common electrode 26 and the separator 36.

The common electrode 26 includes hydrogen storage material 38 and performs multiple functions: (1) a solid-state hydrogen source for the fuel cell component 24; (2) a common electrode 26 for the hydrogen-generating component 22; and (3) a portion or all of the electrode functions as an anode of the fuel cell component 24. The common electrode 26 is a hydrogen storage based electrode and may be activated using the methods described in the preceding sections. A gas containing oxygen may be fed into the fuel cell cathode 28 through a cathode supply line 32.

The disclosed method may remove the oxide layer formed on the surface of the metal hydride powder composition, and may further remove the oxide formed during the electrode fabrication process. The atomic hydrogen formed during the second step can help the hydrogen diffusion when charging the anode, which can reduce the number of cycle runs to reach the maximum discharge capacity. The activation procedure can produce the nickel-rich layer on the surface of the metal hydride powder composition. A nickel-rich layer may increase the electro-catalytic activity of hydrogen storage electrode and thus may improve the hydrogen charging efficiency and the hydrogen discharge kinetics. The application of this two-step activation process may increase the conductivity of the hydrogen storage electrodes due to the removal of metal oxide, and may reduce the amount of nickel needed, leading to a relatively high energy density. The two-step activation process for the hydrogen storage electrodes may lead to a high charging efficiency and high discharge capacity as well as an increased energy density of the electrodes. Therefore, overall performance of the electrochemical system may improve.

The examples provided are merely representative of the work that contributes to the teaching of the present application. Accordingly, these examples are not intended to limit the invention, as defined in the appended claims.

EXAMPLES

Example 1

Preparation of an Electrode

An electrode capable of hydrogen storage is prepared as follows. Amounts of commercially available metal hydride powder compositions are obtained. Samples of the powder compositions are prepared as follows.

In Sample 1, the metal hydride powder composition has an $AB_5$ formula. Particularly, the formula is $MmNi_{4.65}Co_{0.88}Mn_{0.45}Al_{0.05}$. The metal hydride powder composition is contacted with a first solution.

In Sample 2, the metal hydride powder composition has a formula of $MmNi_{3.55}Mn_{0.4}A_{l0.3}CO_{0.4}Fe_{0.35}$. The metal hydride powder composition is contacted with the first solution.

In Sample 3, the metal hydride powder composition has a formula of $V_{2.1}TiNi_{0.5}Hf_{0.05}Co_x$ (x=0 to 0.192). The metal hydride powder composition is contacted with the first solution.

In Sample 4, the metal hydride powder composition has a formula of $LaNi_{3.55}Mn_{0.4}Al_{0.3}(CO_{1-x}Fe_x)_{0.75}$ ($0 \leq x \leq 1$). The metal hydride powder composition is contacted with the first solution.

In Sample 5, the metal hydride powder composition has a formula of $La_2Mg(Ni_{1-x}Al_x)_9$ (x=0 to 0.05). The metal hydride powder composition is contacted with the first solution.

In Sample 6, the metal hydride powder composition has a formula of $Zr_{1-x}Ti_xCr_{0.4}Mn_{0.2}V_{0.1}Ni_{1.3}$ (x<1). The metal hydride powder composition is contacted with the first solution.

In Sample 7, the metal hydride powder composition has a formula of $Zr(Fe_{0.8}Cu_{0.2})_2$ and $Zr(Fe_{0.8}Cu_{0.1}CO_{0.1})_2$. The metal hydride powder composition is contacted with the first solution.

In Sample 8, the metal hydride powder composition has a formula of $Mg_{67-x}Ca_xNi_{33}$. The metal hydride powder composition is contacted with the first solution.

In Sample 9, the metal hydride powder composition has a formula of $Mg$—$TiFe_{0.92}Mn_{0.08}$. The metal hydride powder composition is contacted with the first solution.

In Sample 10, the metal hydride powder composition has a formula of $Mg_{87}Ni_{10}Al_3$. The metal hydride powder composition is contacted with the first solution.

In Sample 11, the metal hydride powder composition has a formula of nanoporous metal-benzenedicarboxylate M(OH)($O_2C$—$C_6H_4$—$CO_2$) (M=Al, Cr). The metal hydride powder composition is contacted with the first solution.

In Sample 12, the metal hydride powder composition has a formula of $Ti_{0.4}Zr_{0.5}Cr_{0.85}Fe_{0.7}Ni_{0.02}Mn_{0.25}Cu_{0.03}$. The metal hydride powder composition is contacted with the first solution.

For each Sample, the first solution includes both potassium hydroxide (KOH) and sodium borohydride ($NaBH_4$). The concentration of the KOH is 6 molar (M) and the concentration of the $NaBH_4$ is 0.03 M. The contact temperature with the first solution is 80 degrees Celsius. The metal hydride powder composition is stirred in the first solution for 5 hours. After the contact with the first solution, the metal hydride powder composition is rinsed with de-ionized water to a neutral pH state. The rinsed metal hydride powder composition is dried in a vacuum system at 50 degrees Celsius for 12 hours. This contact with the first solution removes metal oxide formed on the surface of the grains of the metal hydride powder composition. This contact forms atomic hydrogen on the surface of the metal hydride powder composition to protect the surface from subsequent oxidation.

Alloy slurries are prepared by mixing the treated powder compositions, conductive additives (nickel powder composition, cobalt powder composition or activated carbon), binders (PTFE, PVA, and CMC), and several drops of ethanol in a design of experiment matrix. The ratio of the weights of the powder composition to binder (in milligram, mg) is kept as close as possible to 50:4.

The electrodes are prepared by pasting the alloy slurry onto opposing sides of a nickel foam substrate for each Sample. The electrodes are dried at 80 degrees Celsius for 1 hour. The dried electrodes are pressed into a thin sheet under a pressure of 10 Mpa. The fabricated electrode is then treated in a second solution by immersing into a second solution.

The second solution is prepared by adding KOH and $NaBH_4$. The concentration of the KOH is 6 M and the concentration of the $NaBH_4$ is 0.03 M in the second solution. The contact of the fabricated electrodes with the second solution is carried out at about 80 degrees Celsius for 20 minutes. This contact with the second solution may remove metal oxide formed on the surface of the electrode during the fabrication process.

The performances of the electrodes are evaluated in three-electrode systems. The three-electrode systems include a working electrode, a platinum counter electrode and an SCE reference electrode with salt bridge.

Figure 3:
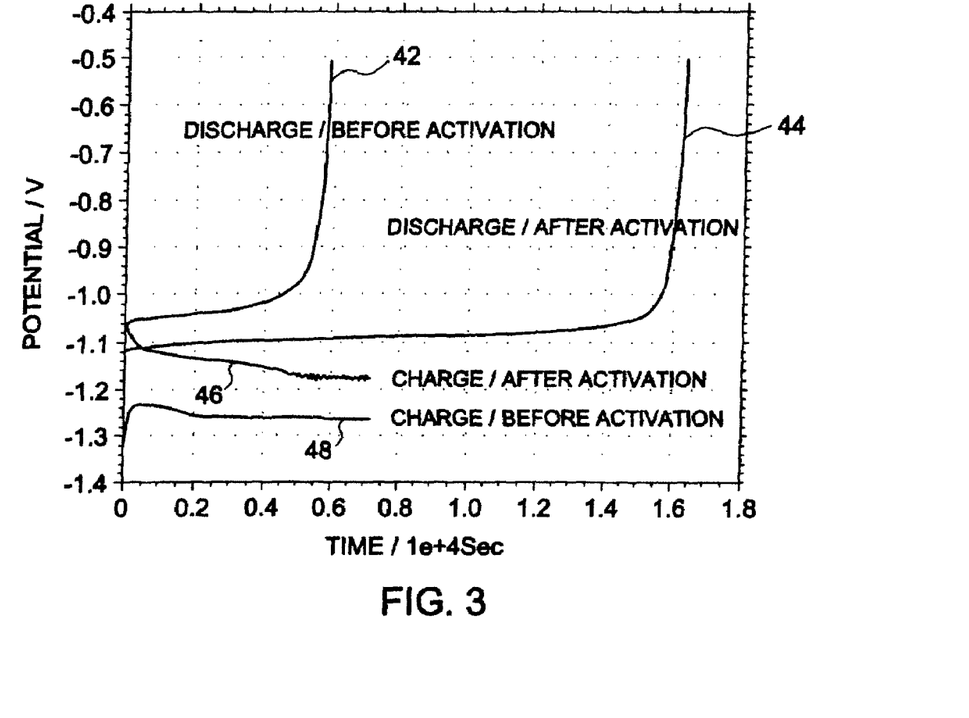
FIG. 3 is an illustration of the comparison of the charge-discharge efficiency with or without the activation process in accordance with a present technique.

A graph shown in FIG. 3 shows the charge and discharge curves of some of the electrodes of Sample 1, with and without activation, in the three-electrode system. The charge and discharge rates are 200 mA/g and 60 mA/g, respectively. The curves 42 and 44 represent the discharge curves before and after activation of the hydrogen-storage based electrodes.

Two characteristics in the performance of the hydrogen storage electrodes are observable. (1) Smaller polarization potentials are observed for metal hydride electrodes treated in the above process for both charge and discharge curves, which suggests the reduction of internal resistance due to the removal of metal oxide from the surface of the metal hydride powder composition and the fabricated electrode after the two-step activation process; and, (2) hydrogen gas evolves earlier on the hydrogen storage electrode without activation and the discharge capacity increase after the activation. This suggests the electrocatalytic activity of the metal hydride in the hydrogen storage electrode and the charge efficiency improve after the activation process.

Figure 4:
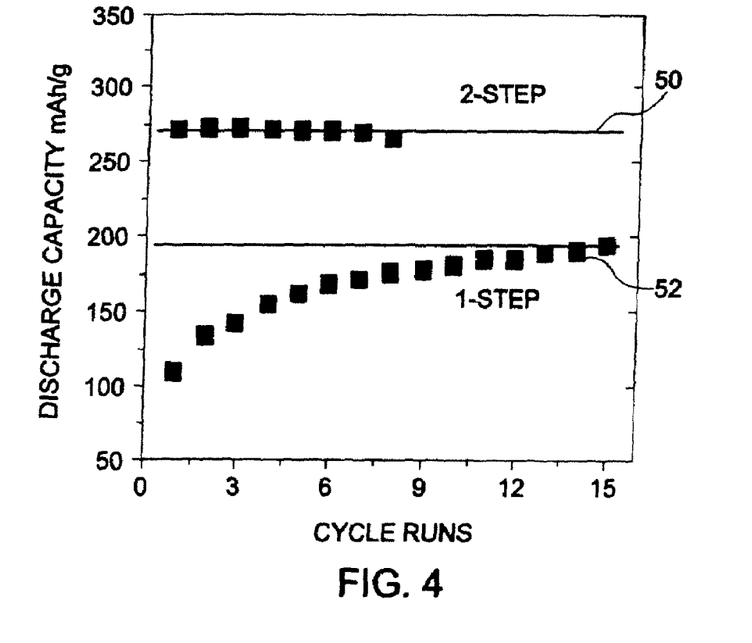
FIG. 4 illustrates the importance of the second step of the activation process wherein the metal oxide is removed from the hydrogen storage based electrodes after fabrication.

With reference to FIG. 4, the graph illustrates the effect of the metal oxide removal from the hydrogen storage electrodes after fabrication. Curve 50 is a plot of discharge capacity of the hydrogen storage electrode when the activation process involves two steps as described earlier. The maximum discharge capacity is achievable within 3 cycles.

With further reference to FIG. 4, curve 52 illustrates the discharge capacity wherein the hydrogen storage electrode is prepared following only the first step and only the metal hydride powder composition is treated in the first solution. The discharge capacity reached the maximum level after 15 cycles. This indicates that both steps in the method of activation described herein contribute to the performance of the hydrogen storage electrode. And, the contributions are not merely additive.

Figure 5:
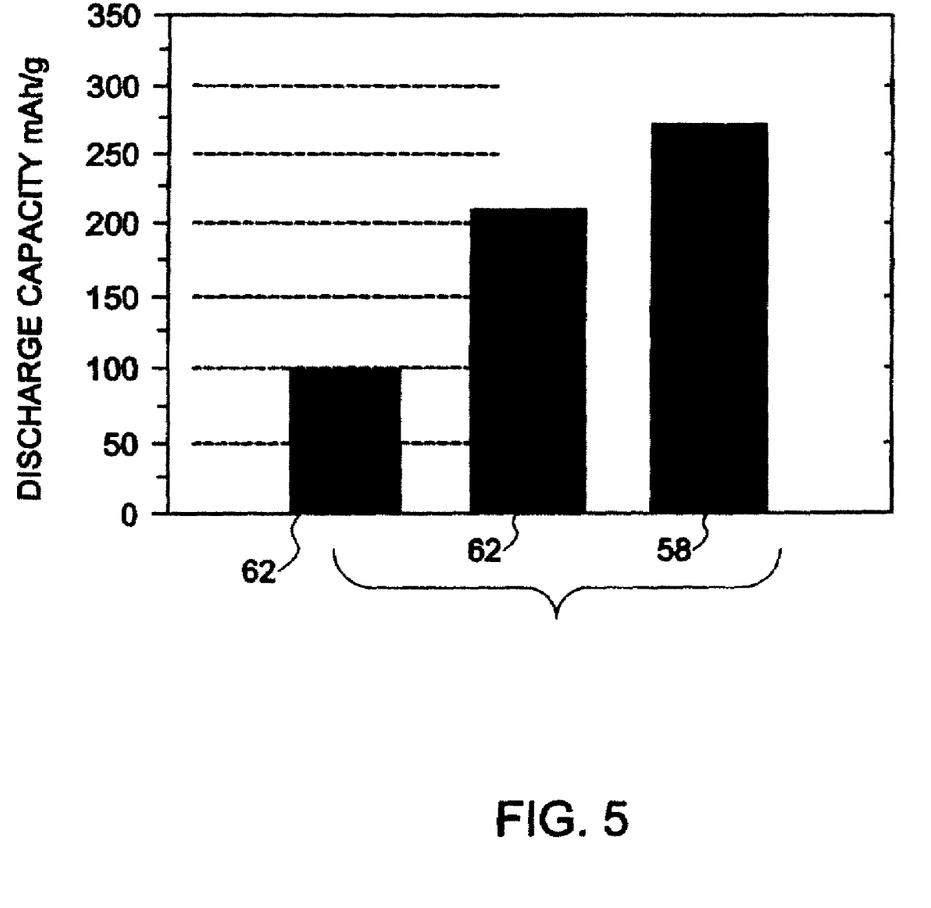
FIG. 5 illustrates discharge capacities obtainable from hydrogen storage electrodes without activation, with first step activation, and with two-step activation.

FIG. 5 shows a comparison of the discharge capacities obtainable from the hydrogen storage electrodes without activation, with only single step activation and with two-step activation. The results show that the two-step activation contact increases the discharge capacity and thus improves the discharge capability. This comparison is evaluatable in an electrochemical device having three electrodes.

The embodiments described herein are examples of articles, systems and methods having elements corresponding to the elements of the invention recited in the claims. This written description may enable those of ordinary skill in the art to make and use embodiments having alternative elements that likewise correspond to the elements of the invention recited in the claims. The scope of the invention thus includes articles, systems and methods that do not differ from the literal language of the claims, and further includes other articles, systems and methods with insubstantial differences from the literal language of the claims. While only certain features and embodiments have been illustrated and described herein, many modifications and changes may occur to one of ordinary skill in the relevant art. The appended claims cover all such modifications and changes.

The invention claimed is:

1. An electrode, comprising:
an electrically conductive substrate; and
a material capable of storing hydrogen on a surface thereof supported by the substrate, wherein the hydrogen storage material is formed by contacting a powder composition with a first solution prior to electrode fabrication and by contacting the hydrogen storage material to a second solution subsequent to electrode fabrication and wherein the hydrogen storage material comprises one or more of $MmNi_{4.65}Co_{0.88}Mn_{0.45}Al_{0.05}$; $MmNi_{3.55}Mn_{0.4}Al_{0.3}Co_{0.4}Fe_{0.35}$; $V_{2.1}TiNi_{0.5}Hf_{0.05}Co_x$ (x=0 to 0.192); $LaNi_{3.55}Mn_{0.4}Al_{0.3}(Co_{1-x}Fe_x)_{0.75}$ (0<x<1); $La_2Mg(Ni_{1-x}Al_x)_9$ (x=0 to 0.05); $Zr_{1-x}Ti_xCr_{0.4}Mn_{0.2}V_{0.1}Ni_{1.3}$ (x<1); $Zr(Fe_{0.8}Cu_{0.2})_2$; $Zr(Fe_{0.8}Cu_{0.1}Co_{0.1})_2$; $Mg_{67-x}Ca_xNi_{33}$; $Mg-TiFe_{0.92}Mn_{0.08}$; $Mg_{87}Ni_{10}Al_3$; $Ti_{0.4}Zr_{0.6}Cr_{0.85}Fe_{0.7}Ni_{0.2}Mn_{0.25}Cu_{0.03}$; or metal-benzenedicarboxylate $M(OH)(O_2C-C_6H_4-CO_2)$ (M=Al, Cr); and
the first solution comprises a first reducing agent and a first alkaline base, and the second solution comprises a second reducing agent and a second alkaline base.

2. The electrode as defined in claim 1, wherein the substrate comprises nickel or stainless steel; and the substrate is a mesh, mat, weave, or foam.

3. The electrode as defined in claim 1, wherein the hydrogen storage material comprises one or more alkali metal borohydrides or alkaline earth borohydrides.

4. The electrode as defined in claim 1, wherein the hydrogen storage material comprises an alkaline earth alanate or catalyzed complex hydride.

5. The electrode as defined in claim 1, wherein the hydrogen storage material comprises one or more electrically conducting polymers selected from the group consisting of polypyrrole, polyacetylene, polyaniline, polythiophene, polyfluorene, poly3-alkylthiophene, polytetrathiafulvalene, polynaphthalene, poly-p-phenylene sulfide, and poly paraphenylene vinylene.

6. The electrode as defined in claim 1, wherein at least one of the first or second reducing agents comprise one or more of sodium borohydride, potassium borohydride, hydrazine, or citrate salt.

7. The electrode as defined in claim 1, wherein at least one of the first or second reducing agents comprise one or more of potassium hydroxide, sodium hydroxide, lithium hydroxide, calcium hydroxide, or ammonium hydroxide.

8. An electrode, comprising:
a hydrogen storage material wherein the electrode has a discharge capacity of greater than about 200 mAh/g, wherein the hydrogen storage material comprises one or more of $MmNi_{4.65}Co_{0.88}Mn_{0.45}Al_{0.05}$; $MmNi_{3.55}Mn_{0.4}Al_{0.3}Co_{0.4}Fe_{0.35}$; $V_{2.1}TiNi_{0.5}Hf_{0.05}Co_x$ (x=0 to 0.192); $LaNi_{3.55}Mn_{0.4}Al_{0.3}(Co_{1-x}Fe_x)_{0.75}$ (0<x<1); $La_2Mg(Ni_{1-x}Al_x)_9$ (x=0 to 0.05); $Zr_{1-x}Ti_xCr_{0.4}Mn_{0.2}V_{0.1}Ni_{1.3}$ (x<1); $Zr(Fe_{0.8}Cu_{0.2})_2$; $Zr(Fe_{0.8}Cu_{0.1}Co_{0.1})_2$; $Mg_{67-x}Ca_xNi_{33}$; $Mg-TiFe_{0.92}Mn_{0.08}$; $Mg_{87}Ni_{10}Al_3$; $Ti_{0.4}Zr_{0.6}Cr_{0.85}Fe_{0.7}Ni_{0.2}Mn_{0.25}Cu_{0.03}$; or metal-benzenedicarboxylate $M(OH)(O_2C-C_6H_4-CO_2)$ (M=Al, Cr).

9. The electrode as defined in claim 8, wherein the electrode has a discharge capacity of greater than about 225 mAh/g.

10. The electrode as defined in claim 9, wherein the electrode has a discharge capacity of greater than about 250 mAh/g.

11. The electrode as defined in claim 8, further comprising an electrically conductive substrate comprising nickel or stainless steel; and the substrate is a mesh, mat, weave, or foam.

12. The electrode as defined in claim 8, wherein the hydrogen storage material comprises one or more alkali metal borohydrides or alkaline earth borohydrides.

13. The electrode as defined in claim 8, wherein the hydrogen storage material comprises an alkaline earth alanate or catalyzed complex hydride.

14. The electrode as defined in claim 8, wherein the hydrogen storage material comprises a titanium dopant.

15. The electrode as defined in claim 8, wherein the hydrogen storage material comprises one or more electrically conducting polymers selected from the group consisting of polypyrrole, polyacetylene, polyaniline, polythiophene, polyfluorene, poly3-alkylthiophene, polytetrathiafulvalene, polynaphthalene, poly-p-phenylene sulfide, and poly paraphenylene vinylene.

16. The electrode as defined in claim 8, wherein the electrode has a relatively smaller polarization potential for both charge and discharge curves relative to an electrode with a hydrogen storage material that is not formed by contacting a powder composition with a first solution prior to electrode fabrication followed by contacting the hydrogen storage material to a second solution subsequent to electrode fabrication; and the first solution comprises a first reducing agent and a first alkaline base, and the second solution comprises a second reducing agent and a second alkaline base.

17. The electrode as defined in claim 8, wherein the electrode at a potential of less than about −0.09 volts during discharge evolves hydrogen in an amount of time relative to the application of the voltage that is less than about $1.4 \times 10^4$ seconds.

18. The electrode as defined in claim 17, wherein the amount of time to hydrogen evolution is less than about $0.6 \times 10^4$ seconds.

19. An electrode, comprising:
a hydrogen storage material wherein the electrode at a potential of less than about −0.09 volts during discharge evolves hydrogen in an amount of time relative to the application of the voltage that is less than about $1.4 \times 10^4$ seconds, wherein the hydrogen storage material comprises one or more of $MmNi_{4.65}Co_{0.88}Mn_{0.45}Al_{0.05}$; $MmNi_{3.55}Mn_{0.4}Al_{0.3}Co_{0.4}Fe_{0.35}$; $V_{2.1}TiNi_{0.5}Hf_{0.05}Co_x$ (x=0 to 0.192); $LaNi_{3.55}Mn_{0.4}Al_{0.3}(Co_{1-x}Fe_x)_{0.75}$ (0<x<1); $La_2Mg(Ni_{1-x}Al_x)_9$ (x=0 to 0.05); $Zr_{1-x}$ $Ti_xCr_{0.4}Mn_{0.2}V_{0.1}Ni_{1.3}$ (x<1); $Zr(Fe_{0.8}Cu_{0.1}Co_{0.1})_2$; Mg—$TiFe_{0.92}Mn_{0.08}$; $Ti_{0.4}Zr_{0.6}Cr_{0.85}Fe_{0.7}Ni_{0.2}Mn_{0.25}Cu_{0.03}$; or metal-benzenedicarboxylate $M(OH)(O_2C-C_6H_4-CO_2)$ (M=Al, Cr).

$Zr(Fe_{0.08}Cu_{0.2})_2$; $Mg_{67-x}Ca_xNi_{33}$; $Mg_{87}Ni_{10}Al_3$;

* * * * *

UNITED STATES PATENT AND TRADEMARK OFFICE
CERTIFICATE OF CORRECTION

PATENT NO. : 8,153,308 B2  
APPLICATION NO. : 11/861789  
DATED : April 10, 2012  
INVENTOR(S) : Huang et al.

Page 1 of 1

It is certified that error appears in the above-identified patent and that said Letters Patent is hereby corrected as shown below:

On the Face Page, in Field (57), under "ABSTRACT", in Column 2, Line 3, delete "mHh/g." and insert -- mAh/g. --, therefor.

In Column 3, Line 45, delete "NaAlH$_4$, Zn(AlH$_4$)$_2$," and insert -- NaAlH$_4$, Zn(AlH$_4$)$_2$, --, therefor.

In Column 3, Line 46, delete "LiAlH$_4$, Ga(AlH$_4$)$_3$," and insert -- LiAlH$_4$, Ga(AlH$_4$)$_3$,. --, therefor.

In Column 4, Line 52, delete "polytetrifluoroethylene" and insert -- polytetrafluoroethylene --, therefor.

In Column 7, Line 19, delete "A$_{10.3}$" and insert -- Al$_{0.3}$ --, therefor.

In Column 7, Line 27, delete "(0≦x≦1)." and insert -- (0<x<1). --, therefor.

In Column 7, Line 55, delete "Zr$_{0.5}$" and insert -- Zr$_{0.6}$ --, therefor.

Signed and Sealed this  
Fifth Day of June, 2012

David J. Kappos  
*Director of the United States Patent and Trademark Office*